United States Patent Office 3,398,934
Patented Aug. 27, 1968

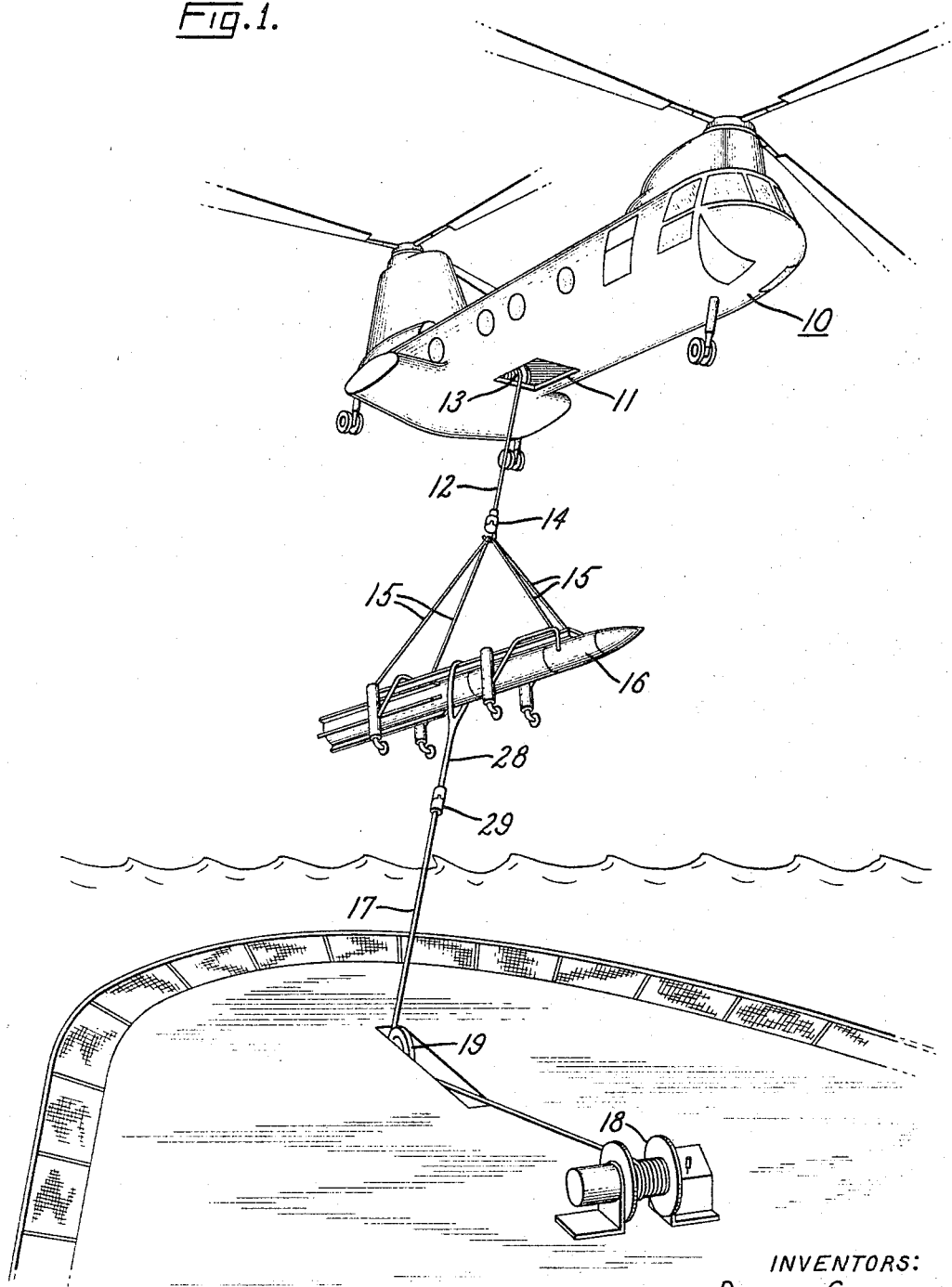

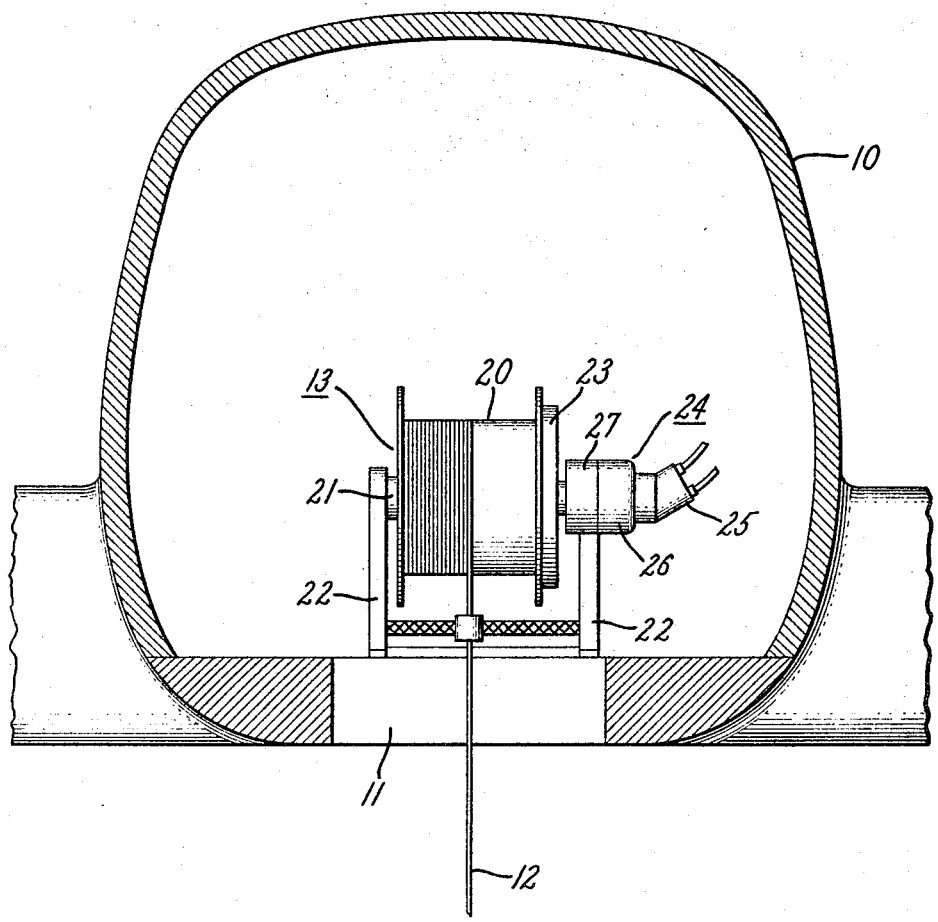

3,398,934
CARGO WINCH SYSTEM
Thomas Lancashire, West Chester, and Dennis Cunliffe, Swarthmore, Pa., assignors to The Boeing Company, Seattle, Wash., a corporation of Delaware
Filed June 20, 1966, Ser. No. 558,811
12 Claims. (Cl. 258—1.4)

ABSTRACT OF THE DISCLOSURE

A vertical replenishment system wherein a constant tension winch is mounted above a constant rate winch and a cargo is secured to and between the winches. The winches are rotated in contra-directions so that the constant tension winch applies a constant tension to the cargo while the downward movement of the cargo under the influence of the constant rate winch causes the constant tension winch to slip.

---

This invention relates to a vertical replenishment system and, more particularly, to a cargo handling system for providing constant control of a load being transferred between an airborne platform capable of hovering and a surface.

For simplicity of description, a helicopter will be used throughout as an example of an airborne platform capable of hovering. However, any airborne platform having hovering capabilities can be used with equal facility and effect.

In the transferring of a load between a helicopter and a ship, many problems are encountered because of the constantly changing spatial relationship between the helicopter and the ship. Due to varying sea conditions, the attitude of a ship at sea is in a constant state of transition. The pitch, roll, and heave of the ship causes its deck to assume constantly changing attitudes in relation to the helicopter. In addition, due to turbulent air conditions, the attitude of a helicoper is in a constant state of change with relation to the ship. Since the forces acting upon the ship and the helicopter are of a different source, magnitude, and effect, the helicopter and the ship will constantly assume different attitudes with respect to each oher.

The constant change in the relative attitudes between the ship and the helicopter makes it extremely hazardous to transfer a cargo between a helicopter and a ship. It is hazardous because, as the cargo is being transferred, the helicopter will tend to rise and fall in a manner and periodicity different from the rise and fall of the ship. Therefore, as the cargo is being lowered to the ship, the ship may rise relative to the helicopter and smash into the cargo; or the helicopter may fall relative to the ship and the cargo may smash into the ship's deck. In addition, if the helicopter should fall relative to its slung cargo, slack will be created in the cable and when the helicopter stops falling, the slack is abruptly taken up and a sudden jerk is produced. This sudden jerk often ruptures the cable or tears the cargo loose causing it to smash upon the ship's deck or be lost overboard. The danger from this occurrence obviously is great to all personnel in the area and to the ship. This is particularly so if the cargo is explosive.

In the past, many attempts have been made to try and control the cargo during transfer to a ship from a helicopter. One such attempt has been the provision of a hoist on an aircraft, the hoist having automatic means for taking up slack in the cable, as shown in U.S. Patent Number 2,358,096. While Patent Number 2,358,096 solves some of the problems, it does not account for the ship rising relative to the helicopter and smashing into the cargo, or for the situation where cargo is being transferred from the airplane to the ship.

The present invention solves the aforesaid problems by providing a cargo handling system wherein a cargo is supported by a winch with a variable speed drive which provides constant tension on the cargo supporting cable while transferring the cargo from a helicopter to a ship's deck and is guided by a constant rate winch on the ship to ensure touchdown at a predetermined specified point without damage to the cargo.

The system insures that the cargo will be retained on the ship's deck at its specific touchdown point, thereby reducing the danger to the ship's crew in handling "free" cargo on a moving deck, and minimizing the dynamic loading on delicate cargo. In addition, the constant rate winch on the ship enables the ship's crew to pull down and maneuver the suspended cargo, thereby eliminating the precise maneuvering required at present by the helicopter pilot.

An object of this invention is to provide a vertical replenishment system for controlling a cargo being transferred between an airborne platform and a surface.

Another object of this invention is to provide a system for the smooth transition of a cargo between an airborne platform and a ship.

Another object of this invention is to provide a cargo handling system for preventing the application of sudden forces to a cargo being transferred between a helicopter and a ship.

Another object of this invention is to provide a vertical replenishment system for transferring a cargo between a helicopter and a surface at a constant rate.

Another object of this invention is to provide a system for minimizing the dynamic loading on a cargo.

Another object of this invention is to provide a system for ensuring cargo touchdown at a specific point.

Another object of this invention is to provide a system for ensuring cargo retention at a touchdown point subsequent to being transferred.

Another object of this invention is to provide a system for transferring cargo between a helicopter and a ship without requiring precise maneuvering of the helicopter.

Another object of this invention is to provide a cargo handling system having fail-safe features.

Another object of this invention is to provide a method of transferring a cargo between a helicopter and a surface.

Another object of this invention is to provide a cargo handling system that is economical to manufacture, easy to install and simple to operate.

Further objects and advantages of this invention will be brought out in the following specification wherein, for the purpose of completeness of disclosure, a preferred embodiment has been described in detail without intending to limit the scope of the invention as set forth in the appended claims.

The attached drawings illustrate the preferred embodiment of the invention, in which:

FIGURE 1 is a perspective view of a helicopter and a ship utilizing this invention.

FIGURE 2 is a sectional view through the helicopter fuselage showing the constant tension winch.

Referring now to the drawings, wherein like reference numbers designate like or corresponding parts throughout the several views; there is shown in FIGURES 1 and 2 a helicopter 10 having a hatch 11 in the fuselage thereof. Extending through the hatch 11 is a cable 12, secured on one end to a constant tension winch 13 which is mounted within the helicopter 10 substantially over the hatch 11. The free end of the cable 12 has a quick disconnect coupling 14 attached thereto for engagement with a sling 15. The sling 15 can be replaced by any of a number of means known to those skilled in the art for supporting loads.

For the sake of illustration, a cargo 16 consisting of an explosive projectile is shown supported by the sling 15. Extending downwardly from the cargo 16 is an attach cable 28. The attach cable 28 is secured on one end to the cargo 16 and extends downwardly therefrom for a predetermined distance. Secured to the free end of the attach cable 28 is a quick disconnect coupling 29. The object of the attach cable 28 is to enable the personnel on a ship to attach one end of a ship's cable 17 to the coupling 29 on the free end of the attach cable 28. The opposite end of the ship's cable 17 is secured to a constant rate winch 18 on the ship.

In order to cause the cargo 16 to touchdown at a specific point on a ship's deck and thereby minimize the danger to the ship's crew, the ship's cable 17 is disposed over a pulley 19, secured to the ship's deck. The location of the pulley 19 can be either fixed or variable depending upon the requirements of the loading and unloading technique, the size and type of cargo, and the location of the winch 18.

FIGURE 2 shows the constant tension winch 13 in greater detail mounted within the fuselage of the helicopter 10. The constant tension winch 13 comprises a drum 20 mounted in a fixed position on a shaft 21 which is rotatably secured to a pair of support brackets 22. The support brackets 22 are mounted on the helicopter fuselage floor in parallel vertical relationship and are adopted to support the drum 20 in a position adjacent the hatch 11. The cable 12 is secured on one end to the drum 20, which has a diameter sufficient to enable the winding and unwinding of the cable 12 around the periphery thereof. The drum 20 is capable of rotating in a clockwise or counter-clockwise direction depending upon the forces applied thereto. A fail-safe means 23 is positioned adjacent the shaft 21 in a manner to prevent the free reeling of the shaft 21 and the drum 20 in case of emergencies. In operation, the fail-safe means 23 is responsive to the operations of a drive means 24 so that in the event of failure or operational deficiencies, the fail-safe means 23 is automatically actuated. The fail-safe means 23 can be responsive to any component of the drive means 24, to the drum 20 or to the shaft 21. When operated in a shaft or drum responsive mode, the fail-safe means 23 senses an overrunning condition and is automatically actuated to prevent free reeling of the drum 20 and the shaft 21. The fail-safe means 23 can comprise any one of a number of conventional brakes; such as that sold commercially by Carlyle Johnson Machine Co. of Manchester, Conn., under the trade name "MAXITORC Disc Pac #23" or, a hydraulically operated brake shoe adopted to be brought into frictional engagement with the shaft 21. The fail-safe means 23 is fixedly secured to the support bracket 22, adjacent the shaft 21. In addition to providing fail-safe operation to the drum 20, the fail-safe means 23 can be used to simulate an additional load on the drum 20 in order to provide greater control of the cargo 16. If the cargo 16 should be suddenly removed from the cable 12, the fail-safe means 23 will provide an additional control means for preventing unexpected free winding of the cable 12.

The drive means 24 is supported adjacent the winch 13 and comprises a motor 25 of either electrical or hydraulic type. The specific type of motor is unimportant to this invention, being as a great number of commercially available motors can be used. The motor 25 is adopted to drive a torque converter 26. The torque converter 26 has a variable adjustable capacity and is capable of slipping when its preset torque is exceeded. Torque converters having the above parameters are commercially available, and since the construction of the torque converter 26 and motor 25 are not considered as part of this invention, the inner workings and structural details of the motor 25 and the torque converter 26 will not be described for the sake of brevity and simplicity. A torque converter suitable for operation in the present invention is sold by the Liquid Drive Corp. of Holly, Michigan, under the designation "SPM-183". The torque converter 26 must be capable of converting the output of the motor 25 to a value equal to, or greater than, that necessary to sustain the cargo 16 in suspension, when the only additional force acting on the cargo 16 is gravity. In order to accomplish this result when the cargo 16 is being lowered from the helicopter 10 to a ship's deck, the winch 13 must apply a constant force on the cargo 16 diametrically opposed to the force of gravity. This force is applied by the drum 20 being rotated in a direction suitable to cause the winding of the cable 12 around the periphery thereof. The drum is driven by the output of a gear reducer 27 which is driven by the torque converter 26 in a manner to either suspend the cargo or cause it to be lifted to the helicopter 10.

The gear reducer 27, torque converter 26 and motor 25 are fixedly secured in a position adjacent one end of the shaft 21. They may be secured to the support bracket 22 or to some other support means adjacent the bracket 22. The gear reducer 27 is of the planetary gear type and capable of reducing the output of the torque converter 26 on a ratio of approximately 100 to 1. While I have specified a 100 to 1 planetary gear reducer, it will be obvious that the type of reducer and its reduction ratio will be dependent upon the type of motor and torque converter used.

In operation, as shown in FIGURE 1, the cargo 16 is secured to a sling 15 and the sling 15 is engaged by the quick disconnect coupling 14 attached to the free end of the cable 12. The helicopter 10 is flown to the point of vertical replenishment and assumes a speed equivalent to that of the ship to be replenished. The attach cable 28 which is secured to the cargo 16 hangs downwardly therefrom. A crewman on the ship will grasp the attached cable 28 and secure it to the free end of the ship's cable 17. After securing the ship's cable 17 to the attached cable 28, the constant rate winch 18, on the ship's deck, is energized. The construction of the ship's winch 18 is unimportant to the novelty of this invention and, therefore, the inner workings and details of its construction will not be elaborated on for the sake of simplicity and brevity. The ship's winch 18, however, must meet certain parameters of operation. It must be capable of providing a constant rate of winding or unwinding to the cable 17. In order to accomplish this parameter, it is obvious that it should be either electrically or hydraulically operated and have a rotatable drum of sufficient diameter to enable the cable 17 to be wound thereon. When the cable 17 is attached to the attach cable 28, the ship's winch 18 is actuated; as the ship winch's drum rotates winding the cable 17 around the periphery thereof, the cargo 16 is drawn steadily towards the ship's deck. Since the constant rate winch 13 is rotating in a direction opposite to that of the ship's winch 18, in order for the cargo to descend the winch 13 must slip while providing a constant tension to the cable 12. It will be obvious to anyone skilled in the art that if the ship should rise relative to the helicopter 10, the slack that is caused in the cable 17 will remove the downward force from the load 16 and since the winch 13 is rotating in a direction opposed to that force, the cargo will be drawn upwardly towards the helicopter 10 and free of the pitching deck of the ship. If the helicopter should drop unexpectedly, causing a slackness in the cable 12, the winch 13 will, because of its pre-set torque, absorb the slack in the cable 12 without any jerks or violent maneuvers.

While a system for lowering a cargo from a helicopter to a ship's deck has been described with particularity, it will be noted that the winch 18 can be mounted on a vehicle or on a fixed platform to provide vertical replenishment to any surface. In addition, since the winch 13 on the helicopter 10 is rotating in a direction to cause the cargo 16 to normally be drawn upwardly towards the helicopter 10, it is possible, when desired, to raise the cargo 16 to the helicopter 10. In raising the cargo 16 to the helicopter 10, the winch 18 is allowed to unwind at a constant rate in order to provide a constant downward force on the cargo 16 in order to control the rate of ascent.

While this invention has been described in a preferred embodiment, it will be obvious to those skilled in the art that modifications and substitutions can be made in some of the apparatus herein without departing from the spirit and scope of this invention. This invention serves a valuable and necessary purpose in the vertical replenishment of ships at sea.

We claim:

1. A vertical replenishment system for transferring cargo between an airborne platform and a cargo-receiving platform having a surface comprising:
    a constant-tension winch mounted on said platform, said winch rotating in a direction to cause the cargo to be drawn upwardly towards said platform and adapted to slip when its preset torque is exceeded;
    a cargo;
    means for supporting said cargo from said constant-tension winch;
    a constant-rate winch on said surface, said constant-rate winch adapted to cause said constant-tension winch to slip when said cargo is being lowered; and
    means for connecting said cargo to said constant-rate winch.

2. A vertical replenishment system in accordance with claim 1 wherein said constant tension winch has a fail-safe means adapted to prevent free reeling of said constant tension winch.

3. A vertical replenishment system in accordance with claim 2 wherein said constant tension winch comprises:
    a rotatably secured winch drum, and
    means for applying a constant rotational force to said drum.

4. A vertical replenishment system in accordance with claim 3 wherein said means for applying a constant rotational force to said drum comprises:
    a motor,
    a torque converter driven by said motor, and
    a gear reducer driven by said torque converter,
whereby said drum is rotatably driven by said gear reducer.

5. A vertical replenishment system in accordance with claim 4 wherein said fail-safe means comprises a brake adopted to apply a load to said drum.

6. A vertical replenishment system in accordance with claim 5 wherein said means for supporting said cargo comprises:
    a sling secured to said cargo,
    a cable coupled to said sling on one end and secured to said constant tension winch drum on its opposite end, and
    an attach cable secured to said cargo and extending downwardly therefrom.

7. A vertical replenishment system in accordance with claim 6 wherein said means for connecting said cargo to said constant rate winch comprises:
    a cable secured on one end to said attach cable and on its opposite end to said constant rate winch, and
    positioning means on said surface for determining the touchdown and haul-up position of said cargo.

8. A vertical replenishment system in accordance with claim 7 wherein said positioning means comprises a pulley disposed over said cable and secured to said surface adjacent said constant rate winch.

9. A vertical replenishment system for transferring cargo comprising:
    a helicopter having a hatch therein;
    a constant-tension winch mounted within said helicopter adjacent said hatch, said winch rotating in a direction to cause the cargo to be drawn upwardly towards said helicopter and adapted to slip when its preset torque is exceeded;
    a fail-safe means adapted to engage said constant-tension winch to prevent free reeling thereof;
    a cargo;
    a cable connected on one end to said constant-tension winch and on its opposite end to said cargo;
    a constant-rate winch mounted on a cargo-receiving platform having a surface, said constant-rate winch adapted to cause said constant-tension winch to slip when said cargo is being lowered;
    a cable for connecting said cargo to said constant-rate winch; and
    a pulley disposed over said cable and adjustably secured to said surface adjacent said constant-rate winch.

10. A method of transferring cargo between an airborne platform and a cargo receiving platform having a surface comprising the steps of:
    securing said cargo to a first winch on said platform,
    rotating said first winch to cause said cargo to be drawn upwardly towards said platform,
    connecting said cargo to a second winch on said surface, and
    rotating said second winch to cause said first winch to slip and said cargo to be drawn towards said surface.

11. A method of transferring cargo between an airborne platform and a cargo receiving platform having a surface in accordance with claim 10 further comprising the steps of constantly controlling the descent of said cargo to ensure its constant descent and touchdown at a specific point.

12. A method of transferring cargo between an airborne platform and a cargo receiving platform having a surface comprising the steps of:
    securing said cargo to a first winch on said surface,
    connecting said cargo to a second winch on said platform,
    rotating said second winch to cause said cargo to ascend, and
    rotating said first winch to allow said cargo to ascend against a constant tension at a constant rate.

References Cited

UNITED STATES PATENTS

| | | | |
|---|---|---|---|
| Re. 22,212 | 10/1942 | Kelton | 258—1.8 |
| 886,287 | 4/1908 | Davis | 254—147 |
| 2,295,537 | 9/1942 | Anderson | 258—1.4 |
| 2,358,096 | 9/1944 | Peterson | 254—172 |
| 2,410,451 | 11/1946 | Landry | 258—1.2 |
| 2,468,652 | 4/1949 | Brassell | 258—1.2 X |
| 2,481,280 | 9/1949 | Beddow | 258—1.2 |
| 2,778,611 | 1/1957 | Cotton | 258—1.2 |

WALTER SOBIN, *Primary Examiner.*